United States Patent
Velu

(10) Patent No.: US 10,609,655 B2
(45) Date of Patent: *Mar. 31, 2020

(54) REDUCING WIRELESS COMMUNICATION TO CONSERVE ENERGY AND INCREASE SECURITY

(71) Applicant: Google LLC, Mountain View, CA (US)

(72) Inventor: Kamesh Raj Velu, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,380

(22) Filed: Nov. 5, 2018

(65) Prior Publication Data
US 2019/0075527 A1     Mar. 7, 2019

Related U.S. Application Data

(63) Continuation of application No. 15/701,976, filed on Sep. 12, 2017, now Pat. No. 10,165,522, which is a continuation of application No. 14/807,496, filed on Jul. 23, 2015, now Pat. No. 9,781,686.

(51) Int. Cl.
*H04W 52/28* (2009.01)
*H04W 52/34* (2009.01)
*H04W 52/20* (2009.01)

(52) U.S. Cl.
CPC ....... *H04W 52/283* (2013.01); *H04W 52/343* (2013.01); *H04W 52/20* (2013.01)

(58) Field of Classification Search
CPC .. H04W 52/20; H04W 52/283; H04W 52/343
USPC ...... 455/69, 522, 418, 41.1, 41.2, 67.11, 62; 370/252, 328, 329, 338
See application file for complete search history.

(56) References Cited

U.S. PATENT DOCUMENTS

| | | | |
|---|---|---|---|
| 5,476,221 A | 12/1995 | Seymour | |
| 6,928,295 B2 | 8/2005 | Olson et al. | |
| 7,884,727 B2 | 2/2011 | Tran | |
| 7,907,971 B2 | 3/2011 | Salo et al. | |
| 8,258,654 B2 | 9/2012 | Parsons | |
| 8,451,773 B2 | 5/2013 | Jiao et al. | |
| 8,498,572 B1 | 7/2013 | Schooley et al. | |
| 8,627,127 B2 | 1/2014 | Mucignat et al. | |
| 8,630,741 B1 * | 1/2014 | Matsuoka | H04L 12/2829 700/276 |
| 8,655,400 B2 | 2/2014 | Kadous et al. | |
| 8,965,441 B1 | 2/2015 | Narasimnhan et al. | |
| 9,042,930 B1 | 5/2015 | Vargantwar | |
| 9,107,172 B1 | 8/2015 | Epstein | |

(Continued)

*Primary Examiner* — Tan H Trinh
(74) *Attorney, Agent, or Firm* — Kilpatrick Townsend & Stockton LLP

(57) ABSTRACT

Various arrangements are presented for controlling a mesh network. An electronic device may determine an occupancy state of a structure. In response to determining that the structure is not occupied, the electronic device may determine whether each node of the mesh network is in communication with at least one device that currently needs wireless communications, wherein the mesh network comprises a plurality of nodes. Power consumption of at least one node of the plurality of nodes of the mesh network may be adjusted based on determining whether each node of the mesh network is in communication with at least one device that currently needs wireless communications.

17 Claims, 5 Drawing Sheets

(56) References Cited

U.S. PATENT DOCUMENTS

| | | | |
|---|---|---|---|
| 9,241,270 B1 | 1/2016 | Logue | |
| 9,667,301 B1 | 5/2017 | Toussi et al. | |
| 9,775,054 B1 | 9/2017 | Srivastava et al. | |
| 9,781,686 B2* | 10/2017 | Velu | H04W 52/283 |
| 10,165,522 B2 | 12/2018 | Velu | |
| 2004/0015575 A1 | 1/2004 | Motoyama | |
| 2004/0214617 A1 | 10/2004 | Kanazawa et al. | |
| 2004/0215750 A1 | 10/2004 | Stilp | |
| 2005/0226201 A1 | 10/2005 | McMillin | |
| 2006/0056368 A1* | 3/2006 | Ratiu | G06F 3/147 |
| | | | 370/338 |
| 2006/0083206 A1 | 4/2006 | Min | |
| 2007/0060064 A1* | 3/2007 | Srikrishna | H04W 52/267 |
| | | | 455/67.11 |
| 2007/0110035 A1 | 5/2007 | Bennett | |
| 2007/0146127 A1 | 6/2007 | Stilp et al. | |
| 2007/0214286 A1 | 9/2007 | Muqattash et al. | |
| 2007/0249386 A1 | 10/2007 | Bennett | |
| 2007/0259659 A1 | 11/2007 | Bennett | |
| 2008/0049716 A1 | 2/2008 | Munguia et al. | |
| 2008/0056201 A1 | 3/2008 | Bennett | |
| 2008/0119130 A1 | 5/2008 | Sinha | |
| 2008/0207114 A1 | 8/2008 | Tuttle | |
| 2010/0081375 A1 | 4/2010 | Rosenblatt et al. | |
| 2010/0097940 A1 | 4/2010 | Asefa et al. | |
| 2010/0202345 A1* | 8/2010 | Jing | H04L 12/2832 |
| | | | 370/328 |
| 2010/0303024 A1* | 12/2010 | Gossain | H04W 72/04 |
| | | | 370/329 |
| 2011/0301722 A1 | 12/2011 | Sato et al. | |
| 2012/0164961 A1 | 6/2012 | Gao et al. | |
| 2012/0213156 A1 | 8/2012 | Liu | |
| 2012/0294168 A1 | 11/2012 | Freda et al. | |
| 2013/0012224 A1 | 1/2013 | Yang et al. | |
| 2013/0021920 A1* | 1/2013 | Nakao | H04L 1/0027 |
| | | | 370/242 |
| 2013/0021929 A1 | 1/2013 | Kim | |
| 2013/0024029 A1 | 1/2013 | Tran | |
| 2013/0030732 A1* | 1/2013 | Shetty | G01D 4/002 |
| | | | 702/62 |
| 2013/0089027 A1 | 4/2013 | Son et al. | |
| 2013/0116001 A1 | 5/2013 | Wang | |
| 2013/0142059 A1 | 6/2013 | Girolamo et al. | |
| 2013/0145396 A1 | 6/2013 | Sung et al. | |
| 2013/0342131 A1 | 12/2013 | Recker et al. | |
| 2014/0001977 A1 | 1/2014 | Zacharchuk et al. | |
| 2014/0080535 A1 | 3/2014 | Gauvreau et al. | |
| 2014/0118120 A1 | 5/2014 | Chen et al. | |
| 2014/0119220 A1* | 5/2014 | Wang | H04W 52/244 |
| | | | 370/252 |
| 2014/0121786 A1 | 5/2014 | Chen et al. | |
| 2014/0171145 A1* | 6/2014 | Che | H04W 52/146 |
| | | | 455/522 |
| 2014/0176308 A1 | 6/2014 | Lee et al. | |
| 2014/0187200 A1 | 7/2014 | Reitter et al. | |
| 2014/0266669 A1 | 9/2014 | Fadell et al. | |
| 2014/0267716 A1 | 9/2014 | Child et al. | |
| 2014/0277763 A1 | 9/2014 | Ramachandran et al. | |
| 2014/0323108 A1* | 10/2014 | Doubek | H04W 52/283 |
| | | | 455/418 |
| 2014/0371942 A1 | 12/2014 | Matsuyama et al. | |
| 2014/0376405 A1 | 12/2014 | Erickson et al. | |
| 2015/0100166 A1 | 4/2015 | Baynes et al. | |
| 2015/0154850 A1 | 6/2015 | Fadell et al. | |
| 2015/0156030 A1 | 6/2015 | Fadell et al. | |
| 2015/0156031 A1 | 6/2015 | Fadell et al. | |
| 2015/0172991 A1* | 6/2015 | Petersen | H04W 40/12 |
| | | | 370/252 |
| 2015/0189068 A1 | 7/2015 | Mohan et al. | |
| 2015/0189426 A1 | 7/2015 | Pang | |
| 2015/0215811 A1 | 7/2015 | Smadi et al. | |
| 2015/0237578 A1 | 8/2015 | Gogate et al. | |
| 2015/0287310 A1 | 10/2015 | Deliuliis et al. | |
| 2015/0296460 A1* | 10/2015 | Lee | H04B 1/3838 |
| | | | 455/522 |
| 2015/0296599 A1 | 10/2015 | Recker et al. | |
| 2015/0300892 A1 | 10/2015 | Malhotra et al. | |
| 2015/0331396 A1 | 11/2015 | Sami | |
| 2015/0334548 A1* | 11/2015 | Liu | H04W 4/80 |
| | | | 370/329 |
| 2015/0373022 A1 | 12/2015 | Dubman et al. | |
| 2016/0029384 A1* | 1/2016 | Sidhu | H04W 72/0453 |
| | | | 370/329 |
| 2016/0040902 A1 | 2/2016 | Shah | |
| 2016/0066123 A1* | 3/2016 | Ko | H04B 17/318 |
| 2016/0088438 A1 | 3/2016 | O'Keeffe | |
| 2016/0088571 A1* | 3/2016 | Choi | H04L 5/0048 |
| | | | 370/329 |
| 2016/0088658 A1 | 3/2016 | Padden | |
| 2016/0092847 A1 | 3/2016 | Buchbinder | |
| 2016/0105812 A1* | 4/2016 | Park | H04W 24/08 |
| | | | 370/312 |
| 2016/0127943 A1 | 5/2016 | Shaw et al. | |
| 2016/0240060 A1* | 8/2016 | Wang | G08B 17/12 |
| 2016/0261425 A1* | 9/2016 | Horton | G05B 15/02 |
| 2016/0295521 A1* | 10/2016 | Grayson | H04W 36/165 |
| 2016/0359325 A1 | 12/2016 | Kawata et al. | |
| 2016/0374028 A1 | 12/2016 | Narang et al. | |
| 2016/0381716 A1 | 12/2016 | Venkatesan | |
| 2017/0005886 A1 | 1/2017 | Dade et al. | |
| 2017/0013663 A1* | 1/2017 | Bora | H04W 52/245 |
| 2017/0018167 A1* | 1/2017 | Dey | G08B 25/008 |
| 2017/0134182 A1 | 5/2017 | Davis et al. | |
| 2017/0245225 A1* | 8/2017 | Zhu | H04W 56/0025 |
| 2018/0035244 A1 | 2/2018 | Amini et al. | |
| 2018/0108230 A1* | 4/2018 | Finnegan | H04M 11/025 |
| 2018/0109999 A1* | 4/2018 | Finnegan | H04L 12/4625 |
| 2018/0324934 A1* | 11/2018 | Wootton | H02J 13/0017 |

\* cited by examiner

REDUCING WIRELESS COMMUNICATION TO CONSERVE ENERGY AND INCREASE SECURITY

CROSS REFERENCES

This application is a continuation of U.S. Non-Provisional application Ser. No. 15/701,976, filed Sep. 12, 2017, entitled "REDUCING WIRELESS COMMUNICATION TO CONSERVE ENERGY AND INCREASE SECURITY," which is a continuation of U.S. Non-Provisional application Ser. No. 14/807,496, filed Jul. 23, 2015, entitled "REDUCING WIRELESS COMMUNICATION TO CONSERVE ENERGY AND INCREASE SECURITY," which are hereby incorporated by reference for all purposes.

BACKGROUND

This disclosure relates generally to wireless communication, and more specifically, to controlling wireless network communication power.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication is typically used in an area, such as a home, apartment, business, or university, to allow users to access and deliver a wide variety of data communications in a wireless manner. In many cases, individuals set up wireless communication networks, such as WiFi networks, in their houses, apartments, or businesses to access the Internet, make VoIP phone calls, send emails, download movies, or play games. Many electronic devices, such as personal computers, video-game consoles, smartphones, tablet computers, and digital audio players, can conveniently connect to and use WiFi networks within range. Frequently, an electronic device, such as a wireless access point (e.g., router), connects the wireless devices to an adjacent wired network (e.g., LAN). The access point acts as a network hub, relaying data between connected wireless devices in addition to wired devices, such as an ethernet hub or switch. As such, the access point allows wireless devices to communicate with wired and/or wireless devices. For example, an occupant of a home with WiFi can download a movie to a tablet anywhere within range of the access point. The WiFi range may depend in part on the frequency, antenna, and transmission power.

The wireless network, while convenient, may have additional security risks compared to traditional wired networks, such as denial of service attacks or hacking (e.g., spoofing/sniffing). For example, if wireless coverage extends outside of the home (e.g., into the yard, street, hallway, or next door apartment), the home wireless network can be accessed by unauthorized users. In some instances, users may not know how to properly configure an access point to encrypt or secure their WiFi. In other instances, if a user tries to encrypt the WiFi, some forms of encryptions can be hacked. While there are a variety of other security measures one can take, such as hidden SSIDs, MAC address filtering, or reducing DHCP address ranges, hackers can find ways to break these methods, such as listening to find the SSIDs or sniffing the WiFi to find a MAC address or IP address to use. If an attacker gains access to the WiFi, the attacker may be able to access and/or intercept accounts, passwords, emails, data on a PC, or launch other forms of attacks. For the foregoing reasons, there is a need to improve security in wireless networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure is directed to a system and method that reduces and/or directs wireless transmission power output of an electronic device to improve security. The less wireless transmission power is utilized, the less likely the wireless communication will be hacked. For example, if a WiFi network is available for a reduced amount of time or at a reduced range, then the odds of an attacker hacking the WiFi network is reduced. The system and method may include an electronic device communicably coupled to one or more other electronic devices in a wireless network associated with a structure. The electronic device, such as a wireless access point, thermostat, camera, hazard detector, door lock, computer, or sensor, may determine a status associated with one or more occupants of the structure. The electronic device may reduce, remove, direct, or otherwise control wireless transmission power output (e.g., to improve security) based on the status.

The status signal may include a home occupancy status signal that indicates a likelihood that occupants are present in a home environment. If occupants are likely not at home, the electronic device, such as a wireless access point, may remove wireless transmission power, or in the alternative, reduce and/or direct wireless transmission power based on the wireless activity. The electronic device may control wireless transmission power when the home is unoccupied. For example, the electronic device may determine whether devices in the home utilize the wireless network when the home is unoccupied. In some cases, transmission power may be reduced by comparing the error rate of communicating with devices on the network to a maximum allowable error rate. For instance, wireless transmission power may be reduced to a transmission power associated with a maximum allowable error rate. Alternatively and/or additionally, the status signal may indicate a time of day or client activity. For example, if it is at night or no wireless clients are active, it may be beneficial to reduce or remove wireless transmission power to reduce the likelihood of an attacker hacking the network.

The system and method may be utilized in a wireless mesh network having a wireless mesh access point that acts as an intermediary device to relay communication from one electronic device to another in a mesh network. An electronic device of the wireless mesh network, such as a thermostat or other wireless mesh access point, may access the status signal and reduce, remove, direct, or otherwise control wireless transmission of the electronic device based on the status signal. Further, some devices in a wireless mesh network may remove or continue transmission depending on whether the wireless mesh access point acts as an intermediary to a device or the device itself needs wireless communication.

The wireless (e.g., mesh or WiFi) electronic device may control wireless transmission range and/or direction based at least in part on the wireless activity (e.g., the type of electronic devices, the type of communication, where electronic devices are located, etc.) on the network. For example, if wireless communication is associated with a type of electronic device that needs to communicate via the WiFi or mesh network, the wireless network may continue to provide communication to the electronic device. On the other hand, if communication is associated with a type of electronic device that does not need to communicate via the WiFi or mesh network, the wireless network may reduce wireless transmission power to a point where wireless communication fails. As such, the wireless transmission range and/or direction may be controlled based on the distance and/or direction of where electronic devices that need WiFi or mesh communication are located. In other words, wireless transmission power may be reduced and/or directed to a setting associated with an allowable error rate for one or more electronic devices that need wireless communication and/or reduced to a setting where the allowable error rate is exceeded for devices that do not need wireless communication.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

I. Wireless Home Network

Figure 1:
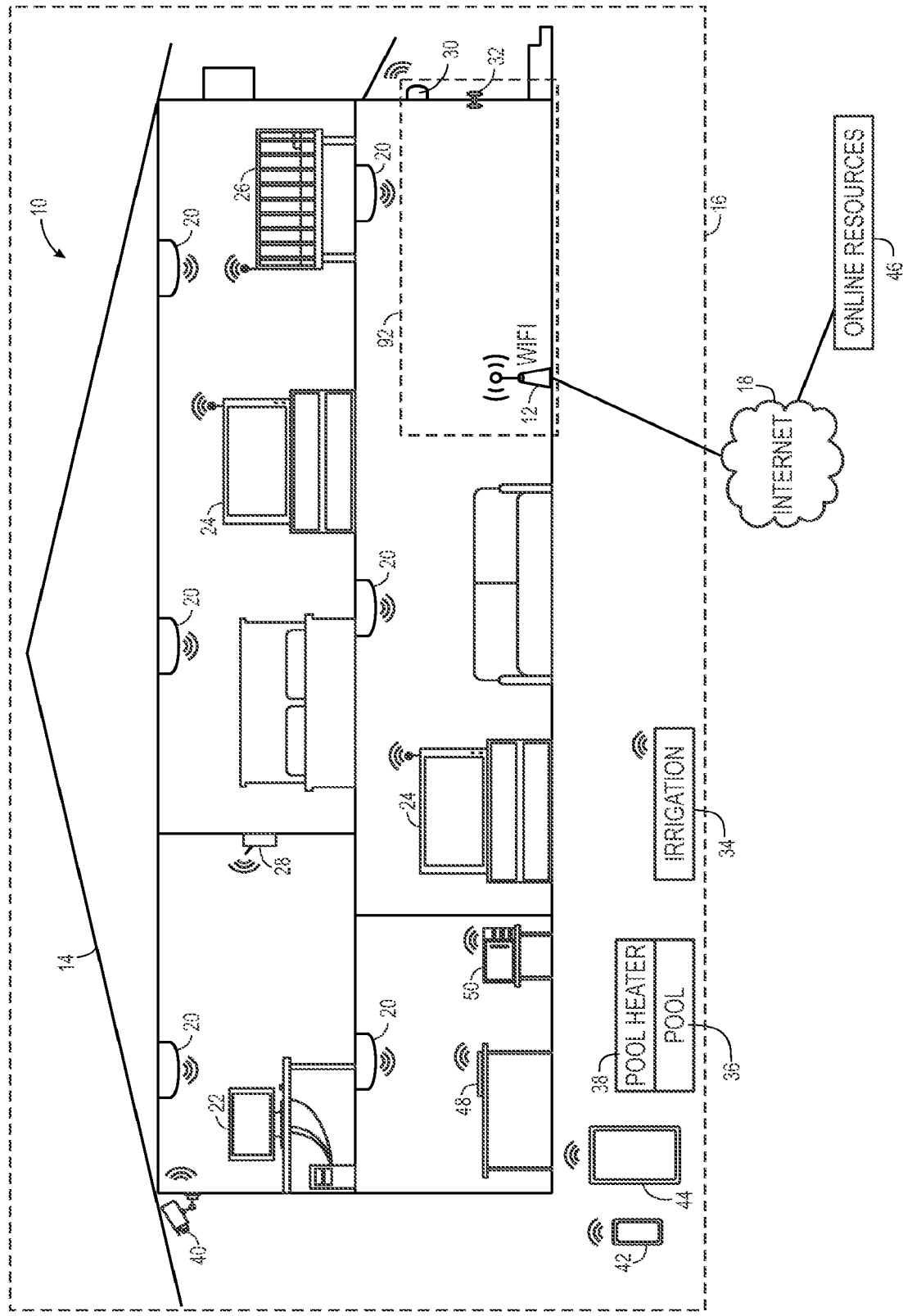
FIG. 1 is a diagram of a home environment in which an, electronic device, such as a wireless access point, communicates with one or more other electronic devices, in accordance with an embodiment of the present disclosure.

The present disclosure relates to a system and method that reduces and/or directs wireless communication, such as WiFi transmission power, when there is reason to do so (e.g., when the home is unoccupied, when the inhabitants are asleep, when no WiFi consumers are active, etc.). By way of introduction, FIG. 1 illustrates a home environment 10 with a wireless access point 12, although it should be understood that multiple access points 12 may be provided. The home environment 10 may include a structure 14 such as a house, office building, garage, or mobile home. As will be appreciated, the wireless network can also be included in a home environment 10 that does not include an entire structure, such as an apartment, condominium, office space, or the like. The wireless access point 12 may be a WiFi router connected directly to a wired Ethernet connection in the structure 14 of the home environment 10. The wireless access point 12 may provide wireless connections using radio communication, and it communicates with electronic devices within range 16 (e.g., transmission range or communication range). The electronic devices may use the wireless access point 12 to communicate with the Internet 18. Accordingly, electronic devices within range 16 may transmit and/or receive data by relaying information to the wireless access point 12.

The home environment 10 may include a wide variety of electronic devices within the structure 14 of the home environment 10. For instance, various sensors 20 may be placed throughout the structure 14, such as motion sensors, infrared sensors, smoke alarm sensors, hazard detection sensors, carbon monoxide sensors, or the like. The home environment 10 may include a computer 22 for an occupant to access email, browse the web, download music, or perform other functions. Often, a home environment 10 may include one or more televisions 24. Further, the home environment 10 may include one or more cameras 26. The camera 26 may be standalone or part of a security system for the home. For instance, a Nest® Dropcam® may be located by a baby crib so the parents can monitor the baby remotely. In certain embodiments, the home environment 10 may include one or more switches 28 (e.g., light switches) that may detect ambient lighting conditions, detect room-occupancy states, and control a power and/or dim state of one or more lights. In some instances, the switches 28 may control a power state or speed of a fan, such as a ceiling fan.

The home environment 10 may include devices outside of the structure 14. The home environment 10 may include devices such as a smart doorbell 30 and/or a door lock 32 that can detect a person's approach to or departure from a location, control audible functionality, announce a person's approach or departure via audio or visual means, or control settings on a security system (e.g., to activate or deactivate the security system). Further away from the house, there may be a WiFi enabled sprinkler system 34. The sprinkler system 34 may communicate with devices in the house or the Internet 18, via the wireless access point 12, to determine if rain is in the forecast and/or to activate or deactivate itself. As further example, the pool 36 may include a pool heater 38 that connects to devices in the house or the Internet 18 to determine if heating the pool 36 is desirable. There may also be one or more security cameras 40 (e.g., IP cameras) outside of the home.

Personal items outside of the home may also be connected to the Internet 18 using the wireless access point 12. For instance, a tablet 42 or a smartphone 44 may be used by the pool 36 and still be within range 16 of the WiFi. The smartphone 44 may be used to communicate with one or more electronic devices connected to the wireless access point 12 via WiFi or a cellular network. For example, a user may control electronic devices with the tablet 42, such as the light switches 28 or the televisions 24, in the house.

The electronic devices, such as the wireless access point 12, may communicate with the devices in the home environment 10 via one or more logical networks (e.g., WiFi, 802.15.1, 802.15.4, Zigbee, Bluetooth, or Zwave). The wireless access point 12 may then communicate with the Internet 18 or another network such that each device may communicate with online resources 46, such as a remote service or a cloud-computing system 46 through the Internet 18. The online resources 46 may be associated with a manufacturer, support entity or service provider associated with a particular device. More specifically, the online resources 46 may communicate with one or more electronic devices in the home environment 10. As an example, the sprinkler system may communicate, via the wireless access point 12, with an online resource 46, such as a server or database, and receive information about nearby weather forecasts to determine if the sprinkler system should run. As further example, the television 24 may communicate with an online resource 46 to determine if firmware should be updated.

In some cases, it may be beneficial for one of the electronic devices to detect or determine a status of the home environment 10, such as a home occupancy status or a time of day. This may be beneficial for many reasons, such as controlling the home environment 10 temperature, lighting, security, or wireless transmission power output. For example, if the home environment is unoccupied, power may be conserved by running heating or air conditioning less. As further example, the light switch 28 may be turned off when no one is within the home environment 10 or at night when occupants are sleeping. In an embodiment of the present disclosure, one of the advantages of detecting and/or determining that the home is unoccupied may include reducing or eliminating wireless transmission power output if the occupants are unlikely to be home.

One or more of the electronic devices described herein may be used to detect and/or determine a status associated with the home environment 10, such as a home occupancy status or a time of day. For instance, the home environment 10 may include a thermostat 48, such as a Nest® Learning Thermostat, communicatively coupled to the WiFi network (e.g., hosted by the wireless access point 12). The thermostat 48 may interact with other electronic devices (e.g., data sources) also coupled to the wireless access point 12 to detect or determine occupancy and/or occupant activity. While the thermostat 48 is used below, it is intended as merely an example, and any suitable electronic device (e.g., smoke alarm) may be used to detect and/or determine occupancy (e.g., a probability of occupancy) and/or occupant activity. In certain embodiments the thermostat 48 may receive information from automation systems 56, security systems 58, and/or power management systems 60 to determine information relevant to occupancy and/or occupant activity within portions of the home environment 10 and/or structure 14. Also, in certain embodiments the thermostat 48 may receive information directly from sensors 20 positioned throughout the structure 14 relevant to occupancy and/or occupant activity within portions of the structure 14. Further, one or more of the "smart" appliances 50 of the structure 14 may be also coupled to the wireless access point 12, which enable the thermostat 48 to determine information (e.g., modes of operation, operation schedules, access or usage schedules, maintenance schedules, and so forth) for these appliances, which may be used to determine or predict occupancy and/or occupant activity within portions of the structure 14.

Further, the thermostat 48 may also detect or determine the presence or activity of certain devices communicating on the communication network hosted by the wireless access point 12. For example, in certain embodiments, the thermostat 48 may be able to detect network traffic being generated by the computer 22, cell phone 44, television 24, or any other networked device of the home environment 10, which may be used as a measure of occupancy and/or occupant activity to determine a probability of occupancy and/or an occupancy probability profile within the home environment 10 and/or portions of the structure 14. By specific example, in certain embodiments, a spike in network traffic by one or more of the devices listed above may indicate that an occupant is actively using a device (e.g., television 22) that may be associated with a particular portion of the structure 14 (e.g., the living room or den). Further, in certain embodiments, the thermostat 48 may receive information regarding the current location (e.g., global positioning system (GPS) coordinates or smartphone 44 location coordinates) of the occupant from one or more electronic devices (e.g., the smartphone 44 or the computer 22), which may be used to determine present activity and predict future activity of the occupant. For example, the thermostat 48 may determine that the occupant is present or away or to predict when the occupant may arrive at the structure 10 based on such occupant location information. Further, a roaming device (e.g., a device moving throughout the structure 14) may indicate that the home environment 10 is occupied. For instance, the tablet 42 may move from close proximity to one wireless access point 12 to close proximity to a second wireless access point.

Being coupled to the communication network of the home environment 10 may also enable the thermostat 48 to interact with certain electronic devices to predict future occupancy and/or occupant activities in the home environment 10. For example, in certain embodiments, an occupant may enable the thermostat 48 to access occupant schedule information from one or more electronic devices. By specific example, an occupant may maintain an agenda or schedule on the computer 22, on the smartphone 44, or using an online resource 46, and the occupant may further grant the thermostat 48 access to the occupant's schedule on one or more of these devices or resources. In certain embodiments, the thermostat 48 may be able to access other occupant information from the computer 22, smartphone 44, and/or online resources 46, such as, for example, the occupant's e-mails, notes, instant messages, to-do lists, or any other suitable data source storing information relevant to predicting future activities of the occupant. By further example, in certain embodiments, the thermostat 48 may access one or more scheduled alarms of an alarm app or application of the smartphone 44 to glean information useful in predicting when the occupant may wake the following day. Accordingly, the thermostat 48 may utilize one or more of these resources to predict future occupancy and/or occupant activity in the structure 10. As further discussed below, the thermostat 48 may utilize these resources to determine if there is a reason to control (e.g., reduce, eliminate, and/or direct by controlling power or radio frequency energy) wireless transmission power output.

II. Wireless Communication

Figure 2:
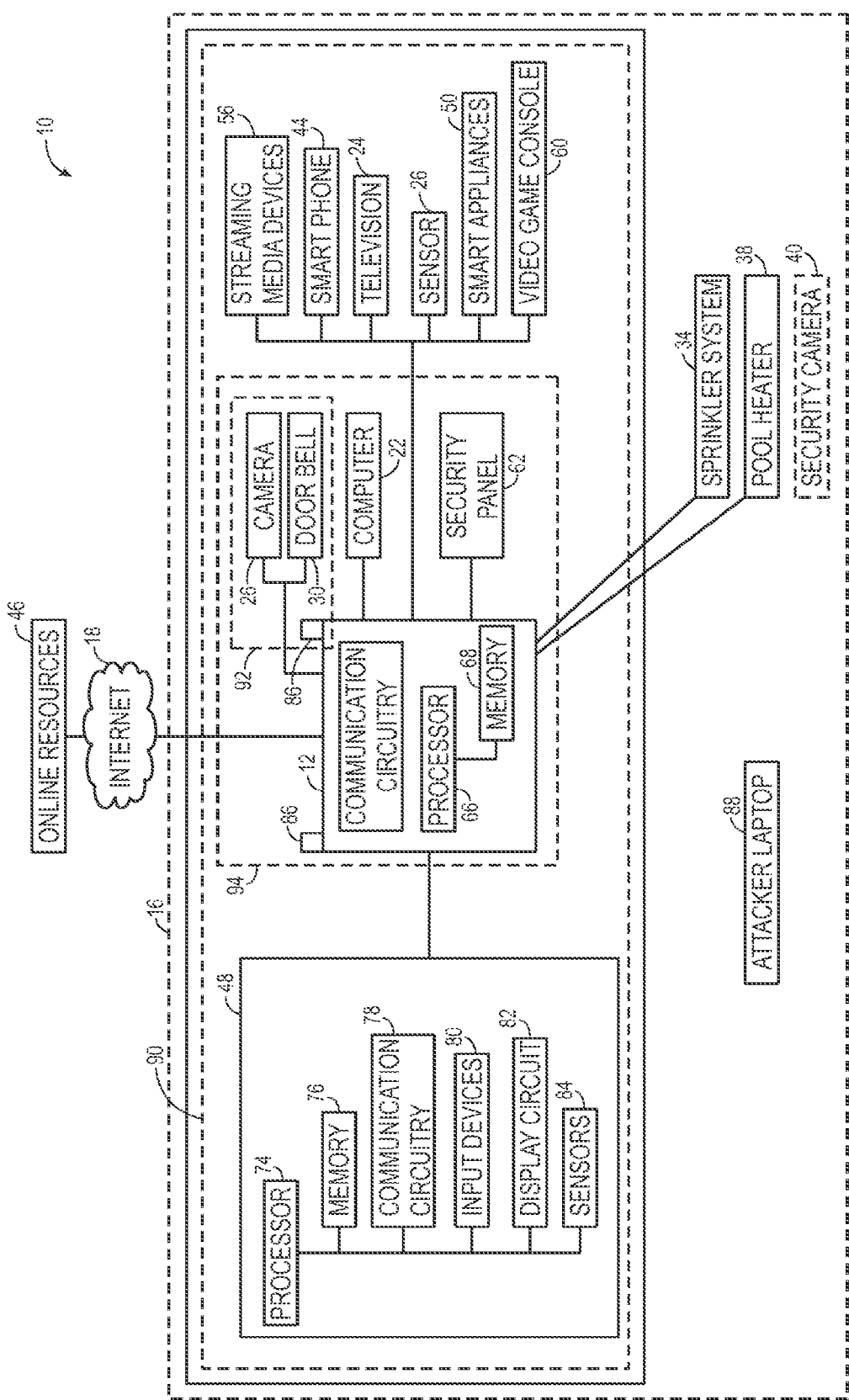
FIG. 2 is a diagram of wireless connections to the wireless access point in the home environment of FIG. 1, in accordance with an embodiment of the present disclosure.

The wireless access point 12 acts as a network hub that relays data between wireless devices and/or wired devices of the home environment 10. FIG. 2 shows a diagram of communication with the access point 12 between devices in the home environment 10 and the Internet 12 and/or other devices. As explained with respect to FIG. 1, some devices may be located inside the structure 14 of the home environment 10, such as the thermostat 48, streaming media devices 56, cellular phones 44, televisions 24, sensors 20, smart appliances 58, video game consoles 60, or the like. Also within the structure 14, the camera 26 and doorbell 30 may be located in a direction and in close proximity to the wireless access point 12 and one another. Further, the computer 22 and security panel 62 may be located in close proximity to the wireless access point 12. Outside of the structure 14, the sprinkler system 34 and the pool heater 38 may still be located within the range 16 of the wireless communication.

The wireless access point 12 may include a processor 66 operatively coupled to a memory 68 that can be configured to control the communication circuitry 72 that controls WiFi transmission power and/or direction. The processor 66 may be configured to execute (e.g., running code) instructions (e.g., software or firmware) stored in the memory 68. The wireless access point 12 may receive signals related to a status of the home environment 10 from the thermostat 48, such as a home occupancy status, time of day, and/or WiFi activity. The thermostat 48 or other device of FIG. 2 may include a processor 74 and memory 76, and the processor 74 is configured to generally manage the temperature of the structure 14 according to the preferences of the occupant. The thermostat 48 illustrated in FIG. 2 also includes communication circuitry 78 (e.g., network interface circuitry) that is configured to enable the thermostat 48 to communicate with other devices and systems via one or more wireless networks (e.g., WiFi). The illustrated embodiment of the thermostat 48 also includes input devices 80 (e.g., knobs, wheels, touchscreens, buttons, dials, or other suitable input devices) to enable a user to directly interface with the thermostat 48 to provide, for example, occupant temperature preferences. The illustrated thermostat 48 further includes display circuitry 82 capable of presenting a graphical user interface (GUI) to display information to the user. Further, the illustrated thermostat 48 also includes a number of sensors 84. For example, in certain embodiments, the sensors 84 may include one or more of the temperature sensing devices, acoustic sensing devices, visible or IR sensing devices, vibration sensing devices, air pressure sensing devices, or EMI sensing devices discussed above.

The communication circuitry 78 of the thermostat 48, the communication circuitry 72 of the wireless access point 12, and/or other electronic devices may include various wired and/or wireless networking interfaces that enable the devices to communicate with other devices. For example, the communication circuitry 70 may include a wireless networking interface, such as an 802.11 a/b/g/n/ac, 802.15.1, 802.15.4, or Zwave interface, to enable the electronic devices to communicatively couple to the wireless access point 12 (e.g., router), which may be the central Internet 18 communication hub for the structure 14.

The communication circuitry 72 of the access point 12 may include one or more antennas 74 that allow the wireless access point 12 to communicate with other devices in the network using, for instance, radio waves. The antennas 74 may be directional or omnidirectional. A directional antenna allows for coverage in a specific direction or directions, whereas an omnidirectional antenna is configured to allow coverage in all directions (i.e. 360 degrees). The directional antenna may be used to direct communication towards electronic devices that desire WiFi when home occupancy status is set to "away". That is, the wireless access point 12 may host the communication network, via the communication circuitry 72 of the structure 14 and may provide wired and/or wireless access to the network as well as the Internet 18, such as online resources 46, for the devices of the structure 14. As will be appreciated, the network illustrated in FIG. 2 is merely provided as an example and that, in other embodiments, the electronic devices may directly communicate with the illustrated devices without the wireless access point 12 (e.g., in a wireless mesh network, or similar topology).

III. Controlling Wireless Transmission Power Output

While the wireless access point 12 is described in detail, the processes described herein may be performed by any suitable electronic device or combination of electronic devices using any suitable communication protocol. For example, electronic devices may be used with radios communicating over wireless protocols other than WiFi, such as 802.15.4, Zigbee, Zwave, or the like. In some embodiments, the electronic device controlling wireless transmission power output may control the wireless transmission power of the electronic device itself. In other embodiments, the controlling electronic device may send a signal to a receiving electronic device to cause the receiving electronic device to control wireless transmission power output of the receiving electronic device or another electronic device. For example, the thermostat 48 may send a signal to the sensor 20 to cause the sensor 20 to control wireless transmission power of the sensor 20. Further, an online resource 46 or service may cause an electronic device to control the wireless transmission power output of the electronic device or one or more other electronic devices.

The controlling electronic device and/or the controlled electronic device may include the wireless access point 12, the thermostat 48, the camera 26, a hazard detector (e.g., one of the sensors 20), door lock 32, doorbell 30, garage door, wristband, watch, fan, desktop, laptop, tablet, light bulb, light switch 28, outlet, refrigerator, stove, microwave, dishwasher, washer, dryer, stereo, intercom, sprinklers, pool heater, security system, appliance, or any other electronic device suitable for wireless communication. For example, the thermostat 48 may be used to control wireless transmission power output of the light switches 28. In another example, the hazard detector (e.g., sensor 20) may be used to control wireless transmission power output of the camera 26. As a further example, a wall plug interface may be used to control wireless transmission power of a fan.

The wireless transmission power, range, and/or direction can be controlled (e.g., reduced, eliminated, or directed) to improve security of the wireless network. For example, a WiFi access point 12 may be set to transmit at maximum power (e.g., 100%) to maximize range and coverage. However, as shown in FIG. 2, the range 16 encompasses an attacker laptop 88, indicating that the attacker could communicate with the wireless access point 12 and thus allow the attacker to can gain access to the system. An electronic device, such as the wireless access point 12, can adjust (e.g., reduce) wireless transmission power of the communication circuitry 72 from range 16 to range 90, thereby excluding the attacker from the wireless network. As another example, if the camera 26 were to communicate with the smart appliance 50, the camera 26 may cause the smart appliance 50 to control the wireless transmission power of the smart appliance 50 to prevent the attacker from gaining access to one or more electronic devices. Alternatively, as shown in FIG. 2, if the wireless access point 12 has directional antennas or can otherwise direct wireless transmission power in a specific direction to devices that use WiFi while occupants are away or asleep, the wireless access point 12 can direct transmission for the devices that use WiFi to provide better network security. As shown by range 92, the access point 12 may direct communication power towards the smart doorbell 30 and camera 26. By directing communication, the doorbell 30 and camera 26 can still communicate via WiFi, and risk of WiFi hacking is reduced. Other wireless transmission power settings, such as range 94, may be used to improve security by limiting the range 94 of communication and allowing the security panel 62, computer 22, doorbell 30, and camera 26 to communicate via the wireless access point 12.

Figure 3:
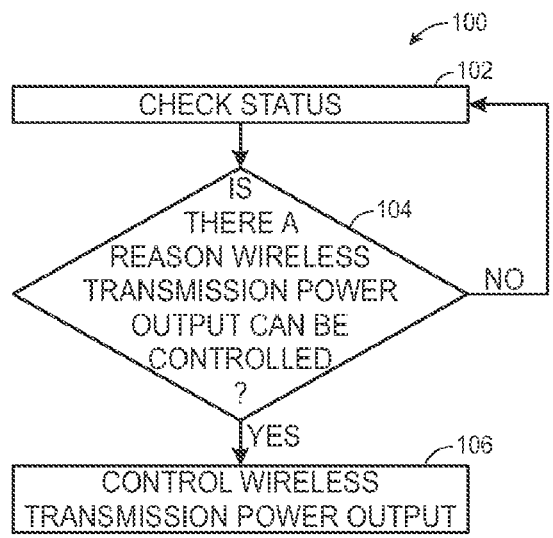
FIG. 3 is a flow chart of a process for controlling wireless communication with the electronic device of FIG. 1 or FIG. 2, in accordance with an embodiment of the present disclosure.

One or more electronic devices may be configured to perform a process to control wireless transmission power and/or direction. FIG. 3 shows a process 100 performed by a processor of one or more of the electronic devices, such as the processor 66 of the wireless access point 12, the processor 74 of the thermostat, a processor of the camera 26, or another electronic device. One or more of the processes described herein may be stored on a tangible, non-transitory computer-readable medium (e.g., the memory 68, 76) having instructions configured to be executed by the processor 66. In an embodiment, the processor 66 may begin by determining (block 102) a status (e.g., a status associated with one or more occupants of the structure), such as checking for wireless activity (i.e., WiFi status), types of electronic devices communicating, transmission power settings, or other aspects of the wireless communication, to determine if the settings can be controlled. The processor 66 may then determine if there is a reason (block 104) (e.g., based on the status) that wireless transmission power output (e.g., WiFi power) can be controlled (e.g., reduced, removed, or directed). If there is not a reason to reduce and/or direct wireless communication power, the process 100 may return to check (block 102) the status again. If there is a reason to control wireless transmission power (e.g., WiFi power), wireless transmission power may then be controlled (block 106).

Figure 4:
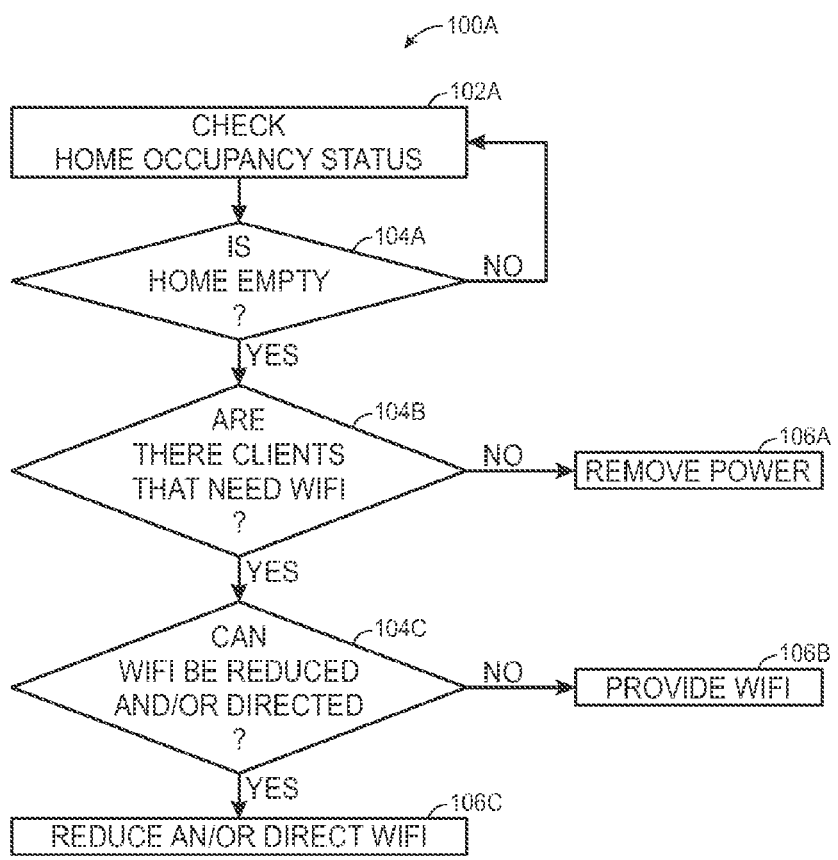
FIG. 4 is a flow chart of an example of the process of FIG. 3 for reducing and/or directing WiFi based on home occupancy, in accordance with an embodiment of the present disclosure.

There are several reasons and/or factors that may be considered when determining whether to reduce and/or direct wireless communication, such as home occupancy, time of day, and client activity. In some cases, wireless communication may not be needed or may be limited when the home is unoccupied, when there is no client activity, and/or when the network is not in use (e.g., when occupants are sleeping at night). FIG. 4 is an example of a process 104A that may be performed by an electronic device, using the process 100 described in FIG. 3. While the process described with respect to FIG. 4 uses the wireless access point 12 as an example, it is meant to be illustrative of a process that can be performed using any suitable electronic device. More specifically, the processor 66 of the wireless access point 12 or the controlling device may begin by checking a status signal, such as a status of home occupancy (block 102A), client activity, and/or time of day (e.g., accessing a status signal), via the communication circuitry 72 of the wireless access point 12 of FIG. 2. The home occupancy status may be based on and/or provide an indication of a probability of occupancy (e.g., likelihood the home is occupied), a Boolean true/false value that indicates whether the home is occupied, or the like. If the home occupancy status indicates that the occupants have left the home, it may be desirable for the an electronic device, such as the wireless access point 12, to reduce, direct, or eliminate WiFi transmission power, as further discussed below. The status signal may be received from the thermostat 48, smoke alarm, computer 22, or any other electronic device suitable for communicating occupancy status. If the home is not empty (block 104A), the processor 66 may begin again and continue accessing signals indicating home occupancy status (block 102A).

When the home is empty, the processor 66 may proceed to check for client activity to determine if there are any clients using wireless communication, such as WiFi, when the home is unoccupied (block 104B). If there are no clients on the WiFi network, the processor 66 may remove WiFi transmission power (block 106A). If electronic devices are on WiFi, the processor 66 may receive data related to client activity, such as the type of client, the type of data, the amount of data, error rates, the location/direction of the client, or other client activity. For instance, a smart doorbell 30, as described above, may communicate information wirelessly about visitors to the home; a computer 22 may be downloading files while the user is away; a security panel 62 may communicate with the Internet; a video game console 60 may be forgotten and left playing; or sensors 20 may communicate wirelessly in the home environment. Bear in mind, the client activity described herein is merely examples, and any device suitable for wireless communication may communicate while the home status is away. Once data related to client activity is received, the processor 66 may determine which devices need WiFi. For example, it may be desirable to continue providing WiFi to a smart doorbell 30, during a low probability that the home is occupied, because the doorbell 30 should continue functioning when no one is home. Additionally, it may be desirable to continue providing WiFi to a security panel 62 to allow security data to be transmitted to the Internet 18. As further example, the computer 22 may need WiFi to continue downloading files for the occupant. A list of devices that need WiFi may be stored in the memory 68, 76.

The type of an electronic device may be found by using, for instance, the MAC address of the device or the type of data sent from the device. As an example, a security camera 40 may need WiFi access to communicate information (e.g., video, photos, time of day, etc.). To determine what devices are on the network, the WiFi access point 12 may receive signals from electronic devices, such as the WiFi security camera 40, indicating the MAC address or the type of electronic device. If the access point 12 receives a MAC address, the wireless access point 12 may utilize the MAC address to determine a manufacturer, vendor, or model of the electronic device. The wireless access point 12 may communicate with the online resources 46 to determine the type of electronic device. The processor 66 may then determine if the device needs access to WiFi based on the type identified by the online resource 46. If the device needs access, the wireless access point 12 may control WiFi transmission power based on the type of devices. For instance, the wireless access point 12 or other electronic device (e.g., thermostat 48) may detect or determine the type of devices outside of the home, such as the pool heater 38 of FIG. 2. The wireless access point 12 may determine that the types of devices detected may not need WiFi when occupants are away and reduce transmission power to range 90. In some cases, many of the devices may not need WiFi within the structure 14.

The processor 66 may then determine if WiFi range may be reduced and/or directed (block 104C). The processor 66 may determine client range, direction, and/or location for one or more of the electronic devices on the WiFi network. For example, a smart doorbell 30 and the WiFi may be positioned at a consistent range, direction, or location. The processor 66 may determine if the WiFi range can be reduced or the WiFi direction may be directed towards the smart doorbell 30 by utilizing error rates and/or the signal to noise ratio to determine WiFi transmission settings corresponding to the location of the smart doorbell 30. The processor 66 may determine if the WiFi range can be reduced or the WiFi direction may be directed based on error rates.

If clients at a distance further from the wireless access point 12 need WiFi, such as the security camera 40 of FIG. 2, then the transmission power setting may be reduced based on error rates of the further devices. If, for instance, there are no clients outside that need WiFi but clients exist, then the transmission power setting may be reduced to a point where devices outside cannot communicate via WiFi (e.g., communication exceeds the maximum allowable error rate). For instance, the processor 66 may reduce transmission power to where the maximum allowable error rate is exceeded for devices such as the sprinkler system 34 and the pool heater 38 of FIG. 2, but not for the smart appliances 50, sensors 20, television 24, or other devices located at a distance closer to the wireless access point 12. Accordingly, the WiFi range would be reduced to inside the structure 14 of the home environment 10. If there are no outside WiFi clients, then the access point 12 may reduce the transmission power setting to the maximum allowable error rate for inside clients.

The process of reducing WiFi may be an iterative method based on packet errors (e.g., the maximum allowable error rate). In the iterative method, the transmission power setting may be incrementally reduced until the packet errors increase to the maximum allowable. Alternatively, the process may be a step method, where power is set from a first transmission power setting to a second transmission power setting. The error rate may be compared to the maximum allowable error rate to determine if the transmission power setting should be increased, decreased, or maintained.

The maximum allowable error rate and packet errors may correspond to a signal-to-noise ratio (SNR). The signal-to-noise ratio is a measure of signal strength relative to background noise. As the transmission power is lowered, the signal strength decreases relative to the noise. The lower signal to noise ratio may be compared to threshold values (e.g., signal-to-noise ratio) to determine if transmission power should be increased, decreased, or maintained. As such, the iterative method and/or the step method may use the signal-to-noise ratio, the maximum allowable error rate, or packet errors to determine the transmission power setting.

Further, if there are multiple access points in an area, power may be reduced in a specific zone. For instance, an area may include a first access point and a second access point. The first access point may not include electronic devices that need WiFi, transmission power, while the second access point may include one or more devices that require WiFi. In an embodiment, power may be reduced on only the first access point, thereby allowing devices that require WiFi to communicate with the second access point.

If the WiFi range cannot be reduced or directed based on the determined error rates, the access point may proceed to provide WiFi (block 106B) at the current settings. This may occur when clients that need to communicate with WiFi are located at the perimeter of the WiFi range. Alternatively, some access points may be configured only either to transmit at maximum range or have power removed. Accordingly, if range cannot be reduced and direction cannot be focused, the WiFi settings may be maintained. If the processor 66 determines that WiFi can be reduced and/or directed (block 104C), then the wireless access point 12 may reduce and/or direct the WiFi transmission power (block 106C). Similarly, if there is a reason to increase power (e.g., occupants have returned home), the system can increase (e.g., activate) wireless communication power.

The processor 66 of the wireless access point 12 may undergo a learning period to establish data related to the clients (e.g., types of electronic devices, MAC addresses, device locations, etc.) and behavior (e.g., how devices are used) with the wireless network when the occupants are away, asleep, or otherwise unavailable. The learning period may occur for a preset time, such as one week, two weeks, or one month. During the learning period, wireless access point 12 may continue to provide WiFi when the home occupancy status indicates that the home is unoccupied. That is, the learning period may include performing the steps of the process 100 described above without controlling WiFi power. In some cases, information related to client activity may be stored in the memory 68, 76 of one of the electronic devices during the learning period. During the learning period, the WiFi access point 12 may determine the behavior of active WiFi clients. Once the learning period 88 establishes client activity when the home is in away status, client information may be used to determine WiFi transmit power. As mentioned above, the smart doorbell 30 and the WiFi may be positioned at a consistent range, direction, or location which is determined during the learning period (e.g., by performing iterative and/or step adjustments to transmission power and/or analyzing error rates). After the learning period ends, the wireless access point 12 may perform the processes 100 described above to reduce, direct, or eliminate WiFi based on the data acquired during the learning period. Further, it may be beneficial to continuously learn about client activity.

IV. Wireless Mesh Networks

Figure 5:
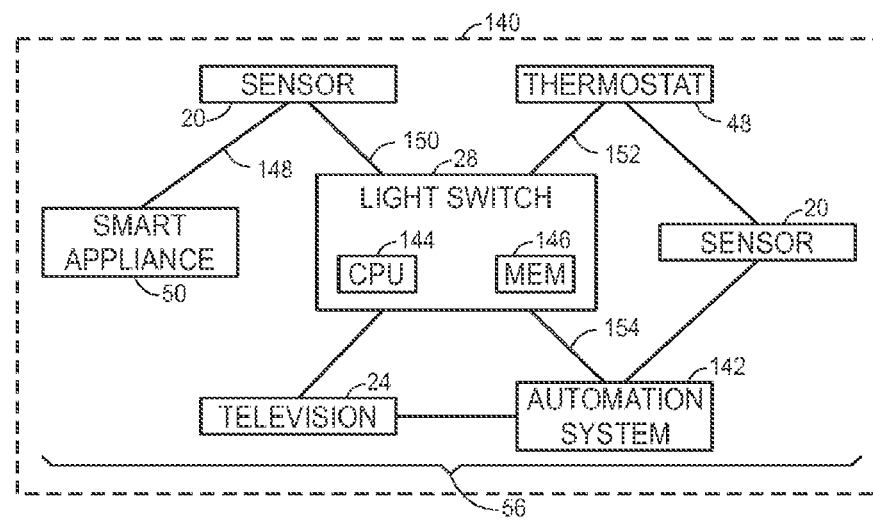
FIG. 5 is a diagram of electronic devices in a wireless mesh network, in accordance with an embodiment of the present disclosure.

While typical some wireless networks, such as WiFi networks, operate in the topology described above, the present disclosure may be applied to other topologies, such as wireless mesh networks. The wireless mesh network 140 of FIG. 5 operates without a central communication hub (e.g., the access point 12 of FIG. 1 and FIG. 2) because two or more of the devices in the mesh network 140 can perform such communication tasks. Similar to the WiFi network described above, a wireless mesh network 140 may have security risks while occupants are away. Accordingly, there is a need in wireless mesh networks to improve security.

The systems and methods described herein address the need for wireless mesh networks to conserve power and improve security by reducing and/or removing communication when there is a reason to do so (e.g., home is unoccupied). In addition to the reasons described with respect to the WiFi network, conserving power in a wireless mesh network has an advantage of improving battery life by wasting less power when occupants are not at home. By improving battery life, the occupants may need to replace batteries less often.

In addition to containing processing and sensing capabilities, such as processor 144 and memory 146 of the light switch 28, several or all of the electronic devices may be capable of data communications and information sharing with other devices within range, as well as to online resources 46 or other devices that may be network-connected anywhere in the world. In one embodiment, the devices may send and receive communications via the wireless mesh network 140 (e.g., fabric network) discussed below. For example, the wireless mesh network may communicate as set forth according to the techniques disclosed by U.S. patent application Ser. No. 13/926,335, entitled "Efficient Communication for Devices of a Home Network" and filed on Jun. 25, 2013, which is incorporated by reference herein in its entirety. The mesh network 140 may enable the devices to communicate with each other via one or more logical networks (e.g., an IEEE 802.15.4 network). As such, certain devices may serve as wireless repeaters and/or may function as bridges between devices, services, and/or logical networks in the home environment 10 that may not be directly connected (i.e., one hop) to each other. In other words, some of the electronic devices may act as wireless mesh access points (i.e., intermediary devices that relay data).

Similar to the WiFi communication described above, the electronic devices of the wireless mesh network 76 may communicate information, via bridge devices (e.g., nodes), to the thermostat 48 to determine if there is a reason to control (e.g., reduce or increase) wireless mesh power. For example, if an occupant turns on the television 24, the usage information may be a factor in determining if there is a reason to control wireless mesh power (e.g., a user is more likely to be at home if a television is turned on and changing channels). By further example, if a smart appliance 62 is turned on or has settings changed, the usage information may be an additional factor to consider determining whether occupants are at home. As shown in FIG. 3, the smart appliance 62 is too far from the thermostat 48 to communicate directly when using a low power wireless standard (e.g., IEEE 802.15.4), and there is no central wireless access point in this wireless mesh network 68. As such, the smart appliance 62 may communicate information (e.g., hop 148) to the sensor 20 (e.g., first mesh access point), which relays (e.g., hop 150) the information to the light switch 28 (e.g., second mesh access point), which then relays (e.g., hop 152) the information to the thermostat 48.

The thermostat 48 may then determine a home occupancy status and/or time of day similar to the methods described with respect to WiFi. The thermostat 48 or other electronic device may then send a signal indicating the home occupancy status to the other devices, such as light switch 28, which indicates a home occupancy status. The home occupancy status may be transmitted throughout the wireless mesh network to several or all of the wireless mesh access points. For instance, the thermostat 48 may transmit the home occupancy status to the light switch 28, which may then relay the home occupancy status information to the sensor 20. Similarly, the light switch 28 may also transmit (e.g., hop 154) an indication of the home occupancy status to the automation system 142.

Figure 6:
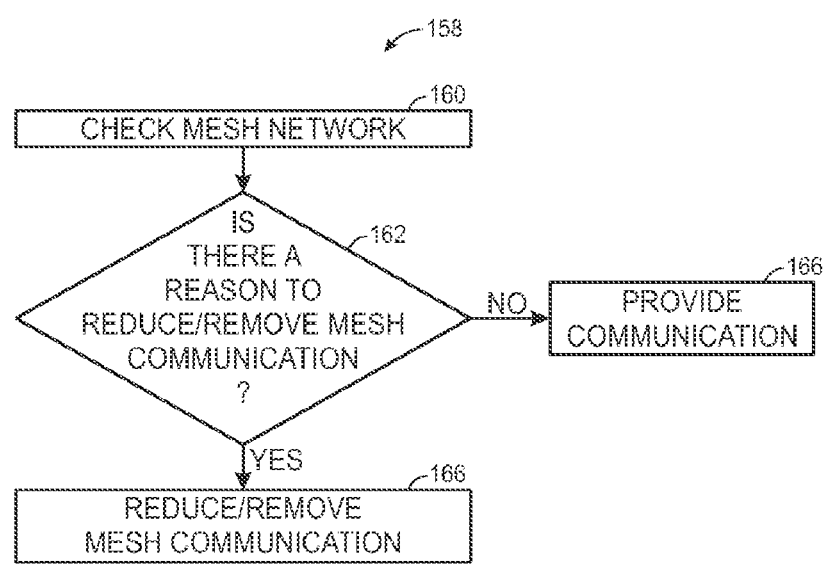
FIG. 6 is a flow chart of a process performed by an electronic device of FIG. 5 for reducing or eliminating wireless mesh transmission, in accordance with an embodiment of the present disclosure.

Similar to a WiFi access point, wireless mesh access points may control wireless power when there is reason to do so (e.g., home occupancy, time of day, device activity). FIG. 6 shows a process 158 performed by the processor 144 of a mesh access point, such as the light switch 28, the thermostat 48, the smoke/carbon monoxide sensor, or other electronic device in the wireless mesh network 140. As explained above, the processor 144 may check (block 160) mesh network information from the thermostat 48 or another mesh node. The processor 144 may then determine (block 162) if there is a reason to control (e.g., reduce/remove) wireless mesh radio power. In some cases, the mesh access point may continue to provide communication (block 164) based on devices that need mesh communication. For instance, if the light switch 28 or a device communicatively coupled to the light switch 28, such as the sensor 20 coupled via hop 150, needs to communicate wirelessly, the mesh access point may maintain communication. Further, if the light switch 28 acts as an intermediary for a device, such as the smart appliance 50, the light switch 28 may maintain communication to provide a channel for the smart appliance 50 to communicate. However, in some cases there may not be devices that require mesh communication. As an example, the light switch 28 may have no devices connected that require wireless communication. If mesh access points, such as the light switch 28, have no devices that require the wireless mesh network, one or more mesh access points may turn off transmission radios (block 166). As explained with respect to WiFi, the mesh access points may reduce radio transmissions based on a maximum allowable error rate or a signal-to-noise ratio.

Figure 7:
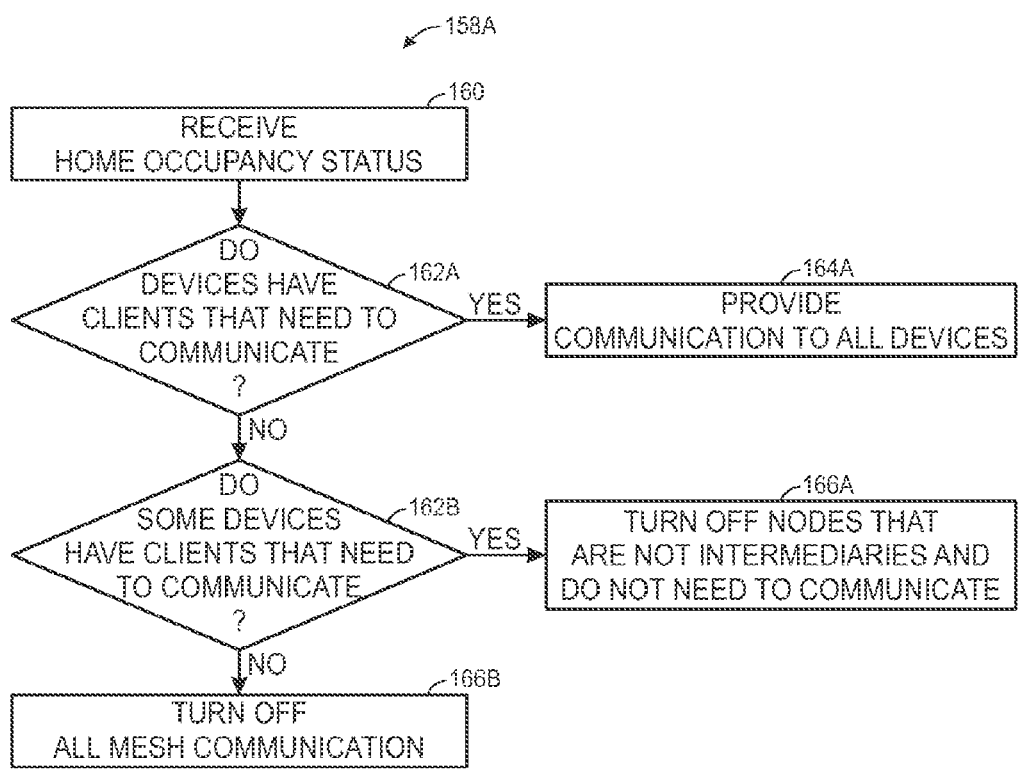
FIG. 7 is a flow chart of an example of the process of FIG. 6 for controlling wireless mesh transmission based on home occupancy, in accordance with an embodiment of the present disclosure.

Transmission power may be controlled while other mesh access points continue transmission. FIG. 7 shows a process 158A that is an example of the process 158 of FIG. 3 that uses home occupancy to control mesh access points. The process 158 may begin by an electronic device receiving a home occupancy status (block 160). The home occupancy status may be a status similar to that described with respect to WiFi (e.g., an indication of a likelihood that the occupants are home/away). The processor 144 may then determine whether all devices have clients that need to communicate (block 162A). For instance, if the smart appliance 50, the sensors 20, the light switch 28, the thermostat 48, the television 24, and the automation system 142 of the wireless mesh network of FIG. 5 need to communicate, the mesh access points may continue to provide communication to all devices 164A. Further, if all mesh access points have at least one device that needs to communicate, all mesh access points may continue to provide communication. For instance, if the smart appliance 50 does not need to communicate, all mesh access points may continue to provide communication to all devices as the smart appliance 50 does not act as an intermediary (e.g., relay communication) for communication to one or more devices. If no devices have clients that need to communicate (block 162B), then the processors 144 may turn off all mesh communication (block 166B).

If some devices have clients that need to communicate (block 162B), then the processors may turn off nodes that are not intermediaries and do not need to communicate (block 166A). For instance, referring back to FIG. 5, if the smart appliance 50 needs wireless communication when home occupancy status is set to away, and the sensor 20 and light switch 28 do not need wireless communication, the sensor 20 and the light switch may continue to transmit information due to the smart appliance's 50 dependency. Further, if the automation system 142 needs to communicate data to the thermostat 48 while occupants are away and neither the light switch 28 nor the sensor 20 need to communicate, one or more of the light switch 28 or the sensor 20 may provide mesh communication to allow desired communication to reach its destination.

While embodiments of the present disclosure may include the advantageous features and/or advantages described herein, the advantageous features and/or advantages are given as examples, and some embodiments do not require that the advantageous features and/or advantages be incorporated. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for controlling a mesh network, the method comprising:
   determining, by an electronic device, an occupancy state of a structure by detecting occupant activity with the structure;
   in response to determining that the structure is not occupied, determining, by the electronic device, whether each node of the mesh network is in communication with at least one device that currently needs wireless communications, wherein:
      the mesh network comprises a plurality of nodes; and
      at least one node of the plurality of nodes functions as an intermediary node that relays data between two nodes of the plurality of nodes of the mesh network; and
   reducing, by the electronic device, power consumption of a node of the plurality of nodes of the mesh network based on determining that the node is not in communication with at least one device that currently needs wireless communications.

2. The method for controlling the mesh network of claim 1, wherein determining whether each node of the plurality of nodes of the mesh network is in communication with at least one device that currently needs wireless communications comprises:
   determining that the node is not functioning as the intermediary node that relays data between two nodes of the plurality of nodes of the mesh network.

3. The method for controlling the mesh network of claim 1, wherein reducing power consumption of the node of the plurality of nodes comprises disabling functionality of the node.

4. The method for controlling the mesh network of claim 1, wherein determining the occupancy state of the structure comprises receiving, by the electronic device, an indication of the occupancy state of the structure.

5. The method for controlling the mesh network of claim 1, wherein reducing power consumption of the node of the plurality of nodes of the mesh network comprises the node turning off a transmission radio.

6. The method for controlling the mesh network of claim 1, the method further comprising:
   in response to determining that the structure is not occupied, determining, by the electronic device, whether every node of the mesh network is in communication with at least one device that currently need wireless communications.

7. A system for controlling a mesh network, the system comprising:
   a plurality of electronic node devices of the mesh network, wherein:
      at least one node of the plurality of electronic node devices of the mesh network functions as an intermediary node that relays data between two electronic node devices of the plurality of electronic node devices of the mesh network;
      each electronic node device of the plurality of electronic node devices of the mesh network comprises:
         communication circuitry comprising a wireless communication radio; and
         a processor in communication with the communication circuitry, wherein:
            the processor of an electronic node device of the plurality of electronic node devices is configured to:
               determine an occupancy state of a structure;
               in response to determining that the structure is not occupied, determine whether the electronic node device is in communication with at least one device that currently needs wireless communications; and
               reduce power consumption of the electronic node device based on determining that the electronic node device is not in communication with a device that currently needs wireless communications.

8. The system for controlling the mesh network of claim 7, wherein the processor of the electronic node device being configured to determine whether the electronic node device is in communication with at least one device that currently needs wireless communications comprises:
   the processor of the electronic node device being configured to determine whether the electronic node device is functioning as the intermediary node that relays data between two electronic node devices of the mesh network.

9. The system for controlling the mesh network of claim 7, wherein the processor being configured to determine the occupancy state of the structure is based on a likelihood that occupants of the structure are home or away.

10. The system for controlling the mesh network of claim 7, wherein the processor being configured to determine the occupancy state of the structure comprises the processor being configured to receive an indication of the occupancy state of the structure.

11. The system for controlling the mesh network of claim 7, wherein the processor being configured to reduce power consumption comprises the processor being configured to cause the electronic node device to turn off a transmission radio.

12. The system for controlling the mesh network of claim 7, further comprising an access point with which one or more electronic node devices of the plurality of electronic node devices communicates.

13. The system for controlling the mesh network of claim 7, wherein the plurality of electronic node devices is comprised of smart home devices.

14. A non-transitory processor-readable medium for controlling a mesh network, the non-transitory processor-readable medium comprising instructions, which, when executed, cause one or more processors to:
  determine an occupancy state of a structure;
  in response to determining that the structure is not occupied, determine whether each electronic node device of a plurality of electronic node devices is in communication with at least one device that currently needs wireless communications, wherein:
    the mesh network comprises the plurality of electronic node devices; and
    at least one electronic node device of the plurality of electronic node devices functions as an intermediary node that relays data between two electronic node devices of the plurality of electronic node devices of the mesh network; and
  reduce power consumption of an electronic node device of the plurality of electronic node devices based on determining that the electronic node device of the mesh network is in communication with at least one device that currently needs wireless communications.

15. The non-transitory processor-readable medium of claim 14, wherein the instructions are further configured to cause the one or more processors to:
  in response to determining that the structure is not occupied, determine whether every electronic node device of the mesh network is in communication with at least one device that currently need wireless communications.

16. The non-transitory processor-readable medium of claim 14, wherein the processor-readable instructions configured to cause the one or more processors to determine whether each electronic node device of the plurality of electronic node devices is in communication with at least one device that currently needs wireless communications comprise processor-readable instructions configured to cause the one or more processors to:
  determine that the electronic node device of the plurality of electronic node devices is functioning as the intermediary node that relays data between two electronic node devices of the mesh network.

17. The non-transitory processor-readable medium of claim 14, wherein the processor-readable instructions configured to cause the one or more processors to determine the occupancy state of the structure comprise processor-readable instructions configured to cause the one or more processors to receive an indication of the occupancy state of the structure.

* * * * *